Oct. 19, 1965  R. E. McMINN  3,212,232
METHOD AND APPARATUS FOR FLUID SEPARATION
Filed April 5, 1962  2 Sheets-Sheet 1
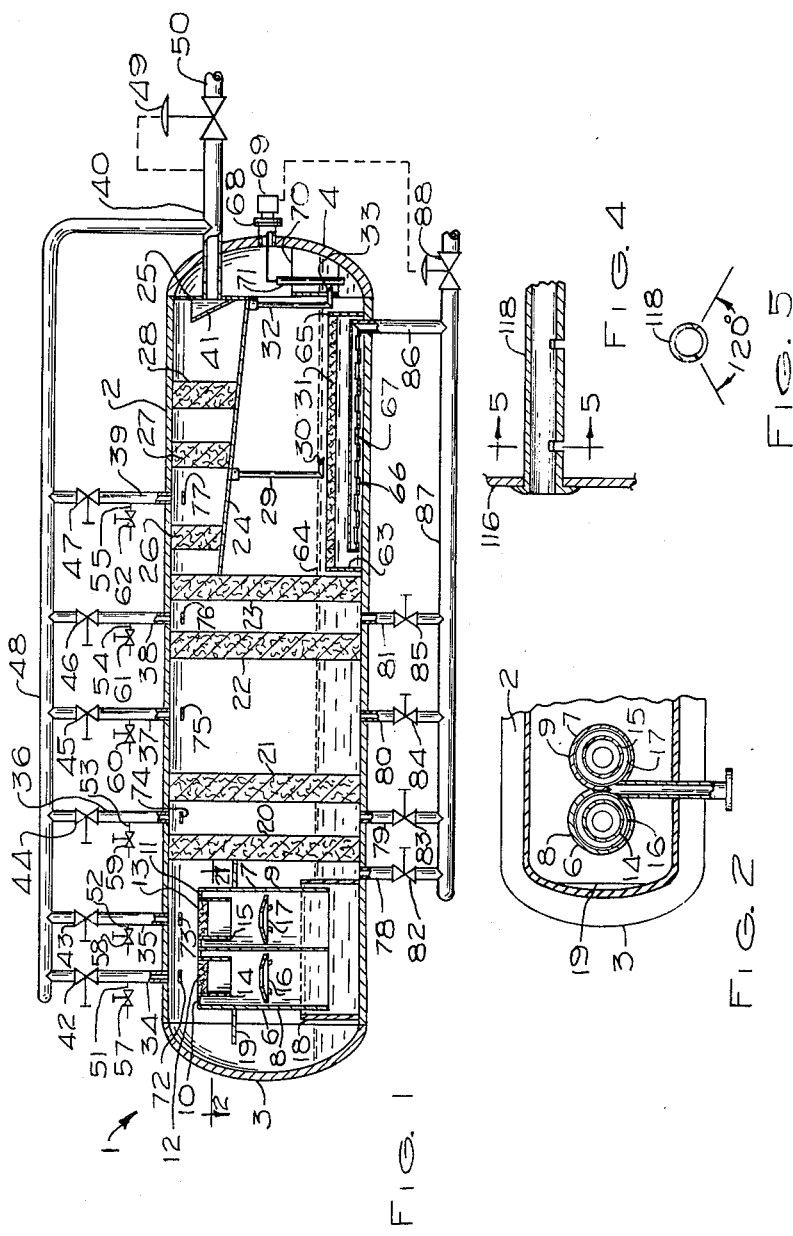
ROBERT E. McMINN
*INVENTOR.*
BY
ATTORNEY.

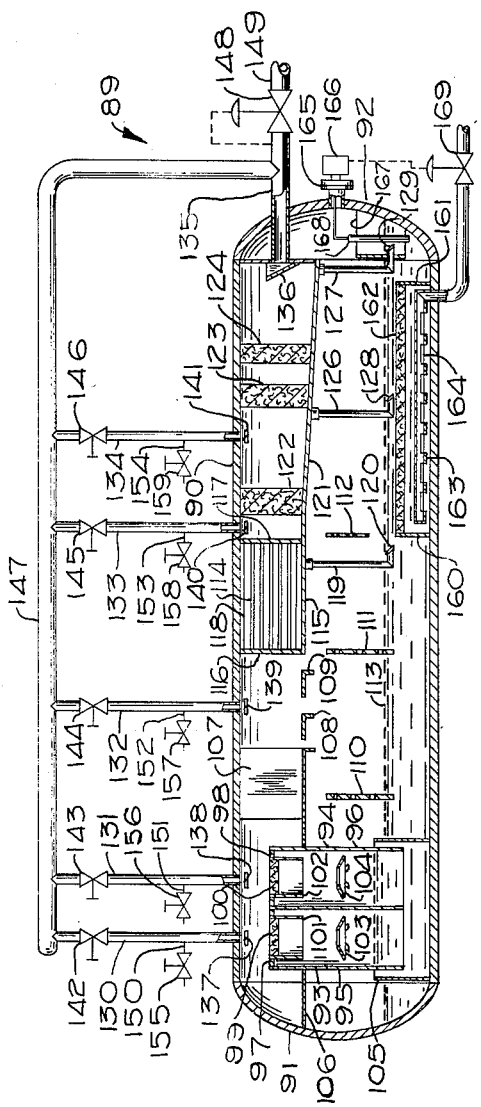

United States Patent Office 3,212,232
Patented Oct. 19, 1965

3,212,232
METHOD AND APPARATUS FOR FLUID SEPARATION
Robert E. McMinn, Oklahoma City, Okla., assignor to Black, Sivalls & Bryson, Inc., Kansas City, Mo., a corporation of Delaware
Filed Apr. 5, 1962, Ser. No. 185,305
7 Claims. (Cl. 55—19)

The present invention relates to a method and an apparatus for the separation of a gaseous component from the liquid component of a fluid steam. Particularly, the present invention relates to a method and an apparatus for the separation of the gaseous hydrocarbons from the liquid hydrocarbons in a hydrocarbon fluid stream.

Prior to the present invention, oil and gas separation has been accomplished in many varied devices and by many methods, but all of them have been concerned with the complete separation of the gas from the liquid in one stage. Such devices have therefore had to be constructed of a size to handle all of the components of the wellstream for that period of time required to make a complete separation. Most separations of this type involve the settling of the liquid component downwardly and the rising of the gaseous component upwardly wherein the liquid component may be discharged from the lower portion of the vessel and the gaseous component may be discharged from the upper portion of the vessel. In many of the devices of the prior art, additional apparatus is employed to accelerate the time of separation in an attempt to utilize a smaller vessel. Such prior improvements have included centrifugal separation by conducting the influent stream into a cylindrical chamber or a cylindrical portion of the vessel tangentially to utilize the velocity of the fluid stream to cause the liquids to collect around the wall of the chamber or vessel and the gases to collect on the interior of the vortex formed by the flow path of the fluid stream. Mist eliminators and tortuous flow paths have also been used in this attempt to speed the time in which it takes to make an adequate separation of the gas from the liquid within the particular vessel being used and also to provide a greater degree of separation whereby little or no liquid will be in the gas after separation and little or no gas will be in the liquid after separation.

A particular difficulty has been encountered in the separation of the gaseous and liquid components of a fluid stream which has a tendency to foam. The time required to provide adequate separation of the gas from the liquid of such streams is greatly increased and will therefore cause the apparatus or separation vessel to be commensurately larger.

The primary object of the present invention is to utilize all of the improvements and most efficient means of separation of gas from liquid of a fluid stream and to provide a still further reduction in the separation time required and therefore a reduction in the size of the vessel required for such separation without impairing the completeness of separation achieved by such prior devices.

A further object of the present invention is to provide an improved method and an apparatus for the separation of the gas and liquid components of an oil and gas stream. Another object of the present invention is to provide an improved method and apparatus for gas and liquid separation in which the separation is accomplished in a series of stages. A still further object of the present invention is to provide an improved separation method and apparatus in which the effectiveness of separation accomplished in each stage is utilized by actually discharging that portion of one or both of the components which has been completely and adequately separated from the fluid stream from the remainder of the fluid streams which is not adequately or completely separated.

These and other objects of the present invention are hereinafter more fully explained and described in the accompanying drawings wherein:

FIG. 1 is a vertical longitudinal sectional view of the preferred form of the present invention.

FIG. 2 is a partial sectional view of the inlet sections of the device illustrated in FIG. 1 taken along lines 2—2 in FIG. 1.

FIG. 3 is a vertical longitudinal sectional view of a modified form of the present invention.

FIG. 4 is a detailed sectional view of a portion of the modified form of the invention illustrated in FIG. 3.

FIG. 5 is a sectional view taken along lines 5—5 in FIG. 4.

Referring more in detail to the drawing:

Vessel 1 as shown in FIG. 1 is a cylindrical vessel positioned horizontally and is composed of shell 2 which is closed by heads 3 and 4. Inlet 5 extends horizontally through shell 2 near head 3 and connects into walls 6 and 7 of cyclones 8 and 9 respectively. Cyclones 8 and 9 are constructed identically except that inlet 5 connects into the adjacent sides so that the swirling of the wellstream in cyclone 8 will be counterclockwise when viewed from above as shown in FIG. 2. The upper parts of cyclones 8 and 9 are closed by annular plates 10 and 11 and mist eliminators 12 and 13 respectively. Cylindrical baffles 14 and 15 depend from the inner edges of annular plates 10 and 11 and terminate a short distance above splash plates 16 and 17. Splash plates 16 and 17 are secured to the inner surface of walls 6 and 7 respectively but have portions of their peripheries which are spaced from walls 6 and 7 to allow liquids collecting thereon to drain to the lower portion of cyclones 8 and 9 without interfering with the passage of gas upwardly through the hole in the center of each of splash plates 16 and 17.

The lower edges of walls 6 and 7 terminate in spaced relationship to the lower inner surface of vessel 1. Weir box 18 is secured to the lower inner surface of vesel 1. The upper level of weir box 18 is positioned at a level in vessel 1 above the lower edges of walls 6 and 7 of cyclones 8 and 9. Also, weir box 18 surrounds cyclones 8 and 9 to provide a liquid seal so that the gas in the incoming wellstream will have to flow out of cyclones 8 and 9 through mist eliminators 12 and 13. Cyclones 8 and 9 are held in position by inlet 5 and by horizontal support member 19 which is secured to the inner surface of vessel 1.

Wire mesh pads 20 and 21 are positioned within shell 2 and are circular in shape extending out to the inner surface of shell 2 to prevent any liquid, foam or gas from bypassing pads 20 and 21. Wire mesh pad 20 is spaced from weir box 18 and wire mesh pad 21 is spaced from pad 20. A second pair of wire mesh pads 22 and 23 are similarly positioned in vessel 1 with pad 22 being spaced a substantial distance from pad 21 and pad 23 spaced from pad 22 a relatively short distance. Pads 20, 21, 22 and 23 are a type of knitted wire mesh with the proper closeness of mesh to assist in the breaking of the foam but not a mesh sufficiently close woven to cause excessive pressure drop of the gas flowing through such pads. It has been discovered that this type of pad will greatly assist in the breaking of the foam bubbles both in the gas space and in the liquid. Generally, it is preferred that the pads be made of the same general type and size of knitted wire but it is within the scope of the present invention to utilize other mesh pads of non-metallic material in accordance with the requirements of each application.

Partition 24 extends across the upper portion of shell 2 spaced from pad 23. Vertical partition 25 extends upwardly from the end of partition 24 nearest head 4. Both partitions 24 and 25 are welded securely to shell 2 or otherwise suitably secured and sealed to prevent the passage of any gas or liquid around these partitions. Mist eliminators 26, 27 and 28 are positioned on partition 24 in spaced relationship to each other with each mist eliminator completely blocking the flow area above partition 24. Drain tube 29 extends through partition 24 between mist eliminators 26 and 27 and extends downwardly into the liquid area below partition 24 with a flapper 30 on its lower end which is positioned immediately above horizontal wire mesh pad 31. Flapper 30 serves as a check valve to prevent the flow of gas or foam upwardly through drain tube 29. Partition 24 is installed within vessel 1 to slope downwardly in the direction toward head 4. Drain tube 32 extends through partition 24 at a point adjacent partition 25 and has its lower end in the lower portion of vessel 1 as hereinafter more fully explained. Flapper 33 covers the lower end of drain tube 32. Flapper 33 serves as a check valve to prevent the flow of gas or foam upwardly through drain tube 32. Gas outlet ducts 34 through 39 extend from the upper portion of shell 2 and are positioned longitudinally along shell 2 as shown in FIG. 1. Gas outlet ducts 34 and 35 are located directly above the centers of cyclones 8 and 9 respectively. Gas outlet duct 36 is connected into shell 2 at a position between wire mesh pads 20 and 21. Gas outlet duct 37 is connected into shell 2 at a position between wire mesh pads 21 and 22. Gas outlet duct 38 is connected into shell 2 at a position between pads 22 and 23. Gas outlet duct 39 is connected into shell 2 at a position between mist eliminators 26 and 27. Gas outlet duct 40 extends through partition 25 and head 4. The inner end of gas outlet duct 40 is covered by baffle 41 which opens upwardly to cause any gas flowing to gas outlet 40 to flow upwardly over baffle 41 before being discharged from vessel 1.

Each of gas outlet ducts 34 through 39 connects through a valve 42 through 47 into manifold 48. Manifold 48 is closed at one end as shown and connects into gas outlet 40. The combined flow of gas from vessel 1 flowing through manifold 48 and gas outlet 40 flows through back pressure control valve 49 and line 50 for delivery to suitable use or transmission service. Each of gas outlet ducts 34 through 39 is provided with sampling lines 51 through 56 which are controlled respectively by valves 57 through 62 respectively.

Vertical partition 63 is positioned immediately adjacent pad 23 in the lower portion of vessel 1 below partition 24. The upper edge of vertical partition 63 terminates below liquid level 64 and provides a chamber in the lower portion of vessel 1 for the collection of gas-free liquid for discharge from vessel 1. Secured to vertical partition 63 and extending to vertical partition 65 is wire mesh pad 31 or other suitable device for removing gas bubbles from oil. Liquid discharge tube 66 is positioned below wire mesh pad 31 and between partitions 63 and 65. Liquid discharge tube 66 is provided with slots 67 along its lower side for withdrawing oil from a position below tube 66 in vessel 1.

Flanged connection 68 is provided in head 4 for liquid level control 69. Float box 70 is secured to the inner surface of head 4 and is open at its upper and lower extremities. It should be noted that flapper 33 of drain tube 32 is within float box 70. Float 71 is positioned within float box 68 which protects float 71 from any turbulence in the liquid within vessel 1 and also prevents foam from collecting around float 71 which might cause it to give a false indication of the height of liquid level 64.

Deflector baffles 72 through 77 are positioned within vessel 1 immediately below gas outlet ducts 34 through 39 respectively to assist in the prevention of entrained mist or liquid splatter flowing out of vessel 1 through gas outlet ducts 34 through 39.

Liquid discharge ducts 78 through 81 connect into the lower extremity of vessel 1 and are controlled by valves 82 through 85 respectively. Each of discharge ducts 78 through 81 and liquid discharge duct 86 are connected into manifold 87 for the discharge of liquid from vessel 1. Liquid discharge duct 86 connects from liquid discharge tube 66 to manifold 87 and is controlled by valve 88 which is operated by liquid level control 69 in response to position of float 71 within float box 70.

In FIG. 3 vessel 89 is similar to vessel 1 in that it is horizontally disposed, and is composed of a cylindrical shell 90, heads 91 and 92 and has a gas inlet structure similar to that shown in FIGS. 1 and 2. The inlet extends horizontally into shell 90 near head 91 and connects through walls 93 and 94 of cyclones 95 and 96 respectively. Cyclones 95 and 96 are constructed identically except that the inlet connects into the adjacent sides so that the swirling of the wellstream in cyclone 95 will be counterclockwise and the swirling of the wellstream in cyclone 96 will be clockwise when viewed from above. The upper parts of cyclones 95 and 96 are closed by annular plates 97 and 98 and mist eliminators 99 and 100 respectively. Cylindrical baffles 101 and 102 depend from the inner edges of annular plates 97 and 98 respectively and terminate a short distance above splash plates 103 and 104. Splash plates 103 and 104 are secured to the inner surface of walls 93 and 94 to allow liquids collecting thereon to drain to the lower portion of cyclones 95 and 96 without interfering with the passage of gas upwardly through the hole in the center of each of splash plates 103 and 104.

The lower edges of walls 93 and 94 terminate in spaced relationship to the lower inner surface of vessel 89. Weir box 105 is secured to the lower inner surface of vessel 89. The upper level of weir box 105 is positioned at a level in vessel 89 above the lower edges of walls 93 and 94 of cyclones 95 and 96. Also, weir box 105 surrounds cyclones 95 and 96 to provide a liquid seal so that the gas in the incoming wellstream will have to flow from cyclones 95 and 96 through mist eliminators 99 and 100. Cyclones 95 and 96 are held in position by horizontal support member 106 which is secured to the inner surface of vessel 89. Support member 106 extends beyond cyclones 95 and 96 and provides a base plate for straightening vanes 107. Baffles 108 and 109 are positioned horizontally across vessel 89 at the same level as support member 106 to allow any liquid collecting on support member 106 to drain into the lower portion of vessel 89. Baffle 109 is also spaced from baffle 108 for the same purpose. Both baffles 108 and 109 have a depending flange on their sides away from support member 106. Perforated baffles 110, 111 and 112 are positioned vertically in the lower portion of vessel 89 under support member 106 and baffles 108 and 109 and are spaced from each other as shown. The upper edges of perforated baffles 110, 111 and 112 are spaced from the lower portion of vessel 89 but baffles 110 and 111 extend downwardly to have their lower edges positioned below liquid level 113.

Tube section 114 is mounted on support plate 115 and comprises tube sheets 116 and 117 and tubes 118. Each of tubes 118 is transversely slotted along its lower periphery for about 120° and is slotted in several positions along its length as best shown in FIGS. 4 and 5. Each of tubes 118 extend through both tube sheets 116 and 117 in a manner similar to boiler tubes or tubes in a heat exchanger. Drain tube 119 connects through support plate 115 and extends into the lower portion of vessel 89 below tube section 114. The lower end of drain tube 119 is closed by flapper 120 which serves as a check valve to prevent the flow of gas or foam upwardly through drain tube 119. Secured to the end of support plate 115, extending toward head 92 and sloped slightly downwardly as best shown in FIG. 3 is partition 121. Mist eliminators 122, 123 and 124 are positioned as shown between partition 121 and the upper inner surface of shell 90 to remove any entrained liquid droplets from the gas stream.

Partition 121 extends to vertical partition 125. Vertical partition 125 is secured to partition 121 and extends upwardly, being welded or otherwise suitably secured to the inner surface of vessel 89. Thus, support plate 115, partition 121 and vertical partition 125 form an entrainment elimination section which is a separate part of the vessel 89 and with all edges being suitably welded to the surface of vessel 89 to prevent the flow of gas from the lower portion of vessel 89 into this entrainment elimination section. Drain tubes 126 and 127 are provided to drain any liquids collecting on the upper surface of partition 121 into the lower portion of vessel 89. The lower extremities of both drain tubes 126 and 127 are positioned below liquid level 113 as is the lower extremity of drain tube 119. Drain tubes 126 and 127 are also provided with flappers 128 and 129 to act as check valves to prevent the flow of gas upwardly through drain tubes 126 and 127.

Gas outlet ducts 130 through 134 extend from the upper portion of vessel 89 and are positioned longitudinally along vessel 89 as shown in FIG. 3. Gas outlet 135 extends through head 92 and vertical partition 125 to discharge gas from the entrainment elimination section formed by partition 125 and partition 121. The open inner end of gas outlet 135 is positioned behind upwardly sloping baffle 136 which causes gas flowing to gas outlet 135 to flow upwardly over baffle 136 before being discharged from vessel 89. Baffles 137 through 141 are positioned below gas outlet ducts 130 through 134 to assist in the prevention of entrained mist or liquid splatter from being discharged through gas outlet ducts 130 through 134 respectively.

Gas outlet ducts 130 through 134 connect through valves 142 through 146 into manifold 147. Manifold 147 connects into gas outlet 135. The total gas flowing from vessel 89 is conducted through back pressure control valve 148 and delivered to line 149. Each of gas outlet ducts 130 through 134 is provided with sampling lines 150 through 154 which are controlled respectively by valves 155 through 159.

Vertical partition 160 is positioned in the lower portion of vessel 89 immediately below perforated baffle 112. The upper edge of vertical partition 160 terminates below liquid level 113 and provides a chamber in the lower portion of vessel 89 for the collection of gas-free liquid for discharge from vessel 89. Secured to vertical partition 160 and extending to vertical partition 161 is wire mesh pad 162 or other suitable material for removing gas bubbles from oil. Liquid discharge tube 163 is positioned below pad 162 and between partitions 160 and 161. Tube 163 is provided with slots 164 along its lower side for withdrawing oil from a position below tube 163 in vessel 89. Flanged connection 165 is provided in head 92 for liquid level control 166. Float box 167 is secured to the inner surface of head 92 and is open at its upper and lower extremities. Float 168 is positioned within float box 167 which protects float 168 from any turbulence in the liquid within vessel 89 and also prevents foam from collecting around float 168 which might cause it to give a false indication of the height of liquid level 113.

In operation the influent wellstream flow is similar in both forms of the invention illustrated. In reference to vessel 1 of FIGS. 1 and 2 the influent wellstream is conducted through inlet 5 and is discharged into cyclones 8 and 9. The flow in each of these cyclones is the same except for the direction of rotation of the flow as previously mentioned. The fluid stream will flow around the inner surface of wall 6 of cyclone 8 with a substantial portion of the liquid component of the fluid stream being forced into contact with the inner surface of wall 6 by the centrifugal force of the rotation. These liquids will flow downwardly on wall 6, through the space between wall 6 and splash plate 16 and into the liquid collected in weir box 18. The gaseous component of the fluid cylindrical baffle 14 will flow upwardly and out of the cyclone 8 through mist eliminator 12. The flow in cyclone 9 is substantially as described hereinbefore for cyclone 8 except as previously mentioned for the direction of rotation.

Valves 42 and 43 in gas outlet ducts 34 and 35 are set to discharge the gas flowing from cyclones 8 and 9 through mist eliminators 12 and 13 in an amount which approaches the total amount of gas that may be withdrawn without withdrawing any entrained mist through gas outlet ducts 34 and 35. This is accomplished by opening valves 57 and 58 to allow a very small portion of the gas flowing through gas outlet ducts 34 and 35 to flow through sampling lines 51 and 52. With this small amount of gas flowing, valves 42 and 43 can be adjusted by gradually opening them until the first amount of liquid is detected flowing out sampling lines 51 and 52. This may be detected by holding a clean white rag or paper over the outlet of sampling lines 51 and 52 and adjusting valves 42 and 43 until the maximum flow of gas through gas outlet ducts 34 and 35 is achieved without the withdrawal of any entrained liquids. When this is accomplished, valves 57 and 58 should be closed.

The portion of the gas stream which is not discharged through gas outlet ducts 34 and 35 flows through wire mesh pads 20, 21, 22 and 23 and above partition 24 and through mist eliminators 26, 27 and 28. Gas is discharged from vessel 1 through gas outlet ducts 36, 37, 38 and 39 which are adjusted to withdraw gas in the maximum amount possible from each section of the vessel without the withdrawal of any entrained liquids. The adjustment of these valves 44, 45, 46 and 47 is accomplished in the same manner as previously discussed with regard to the adjustment of valves 42 and 43. It should be noted that any other suitable method of manually or automatically setting valves 42 through 47 for the proper amounts of gas flow therethrough without any flow of entrained liquids may be used without departing from the spirit of the present invention. The gas which is not discharged through any of gas outlet ducts 34 through 39 is discharged from vessel 1 through gas outlet 40. Wire mesh pads 20, 21, 22 and 23 are designed to perform a dual function. First or primary function is to provide a surface on which the liquid which has surrounded some of the gas to form a bubble will collect whereby the liquid film is broken and the gas is released. The secondary function of these pads is to provide a primary removal of any entrained liquids being carried by the gas stream while the final mist elimination from the gas stream will be accomplished by mist eliminators 26, 27 and 28. Liquid which has been separated from the gas stream above partition 24 is drained into the lower portion of vessel 1 through drain tubes 29 and 32. As previously mentioned, the lower ends of drain tubes 29 and 32 are provided with flappers 30 and 33 respectively to prevent the flow of any gas or film upwardly therethrough.

The liquid and foam within cyclones 8 and 9 flow downwardly and collect within weir box 18. As the level of liquid within weir box 18 builds up it is forced to flow under the lower edges of walls 6 and 7 and then upwardly to overflow the upper edge of weir box 18. The liquid collecting between weir box 18 and pad 20 will contain some gas free of liquid. Therefore, valve 82 should be opened to permit the discharge of gas free liquid from this section of vessel 1 but care should be taken that no gas is discharged through liquid discharge duct 78. This may be accomplished by checking the gas-liquid ratio being discharged from vessel 1 with the gas-oil ratio of the influent stream. Any decrease in the discharged gas-oil ratio will indicate that some gas is being discharged through liquid discharge duct 78. It is also within the scope of the present invention to provide a float within vessel 1 which controls the discharge of liquid through liquid discharge duct 78 or any other suitable means of allowing discharge of only gas free liquid therethrough. If a float is used, it should be connected to control valve 82. It is desired that the maximum amount of gas free liquid be discharged through duct 78 and also through liquid discharge ducts 79, 80 and 81. Therefore, valves 83, 84 and 85 are adjusted to allow the maximum discharge of gas free liquid from vessel 1 through liquid discharge ducts 79, 80 and 81. The liquids discharged from vessel 1 through liquid discharge ducts 78 through 81 are conducted to manifold 87. Liquid discharge duct 86 controlled by valve 88 in response to the position of float 71 will also discharge liquid from vessel 1 into manifold 87. The gasified liquid will flow through pads 20, 21, 22 and 23. As previously mentioned, the function of these pads is to break the foam. This requires that the liquid film be broken to release the gas trapped within the foam bubbles. The liquid after flowing through pad 23 will overflow partition 63 and collect above wire mesh pad 31. Since any oil containing foam will be lighter than the gas free oil, only gas free oil will settle through pad 31 for discharge from vessel 1 through liquid discharge tube 66 and liquid discharge duct 86. Pad 31 further serves the function of removing the smallest bubbles of gas which may be contained in the oil after it has passed through pads 20, 21, 22 and 23. The slots 67 provided in liquid discharge tube 66 are designed to withdraw oil only from the extreme portion of vessel 1 between partitions 63 and 65.

With regard to the operation of the form of the present invention shown in FIG. 3 the fluid stream is conducted into vessel 89 into cyclones 95 and 96. The flow in each of these cyclones is the same with the exception of the direction of rotation of the flow as previously mentioned. The fluid stream will flow around the inner surface of wall 93 of cyclone 95 with a substantial portion of the liquid component of the fluid stream being forced into contact with the inner surface of wall 93 by the centrifugal force of the rotation. These liquids will flow downwardly on wall 93, through the space between wall 93 and splash plate 103 and into the liquid collected in weir box 105. The gaseous component of the fluid stream flowing into cyclone 95 will flow around the space between wall 93 and cylindrical baffle 101. The gas flowing under cylindrical baffle 101 will flow upwardly and out of cyclone 95 through mist eliminator 99. The flow in cyclone 96 is substantially as described for the flow in cyclone 95 except, as previously mentioned, for the direction of rotation.

Valves 142 and 143 in gas outlet ducts 130 and 131 are set to discharge the gas flowing from cyclones 95 and 96 through mist eliminators 99 and 100 in an amount which approaches the total amount of gas that may be withdrawn without withdrawing any entrained mist through gas outlet ducts 130 and 131. Valves 155 and 156 are opened to allow a very small portion of the gas flowing through gas outlet ducts 130 and 131 to sample through sampling lines 150 and 151. With a small amount of gas flowing, valves 142 and 143 can be adjusted by gradually opening them until the first amount of liquid is detected flowing out of sampling lines 150 and 151. This may be detected by holding a clean white rag or paper over the outlet of sampling lines 150 and 151, and adjusting valves 142 and 143 until the maximum flow of gas through gas outlet ducts 130 and 131 is achieved without the withdrawal of any entrained liquid. When this is accomplished, valves 155 and 156 should be closed.

The portion of the gas stream which is not discharged through gas outlet ducts 130 and 131 flows through straightening vanes 107 and tube section 114, through mist eliminators 122, 123 and 124. Gas is also withdrawn through gas outlet ducts 132, 133 and 134 with valves 144, 145 and 146 being adjusted in accordance with the foregoing discussion regarding the adjustments of valves 142 and 143. The gas being discharged from vessel 89 through gas outlet ducts 130 through 134 is conducted to manifold 147. The gas flowing through manifold 147 connected into gas outlet 135 wherein all of the gas being discharged from vessel 89 is combined and conducted under control of back pressure regulator 148 to line 149.

Any liquids which are removed from the gas chamber ahead of tube section 114 will drain into the lower portion of vessel 89 through the spaces between support member 106 and baffle 108 and between baffle 108 and baffle 109. It is well known that in attempting separation of foaming oils that the initial separation such as performed in cyclones 95 and 96 will not completely free the gas stream of the liquid foam and entrained liquid droplets. Further, when excess foaming conditions are encountered, it is not unlikely that the foam will rise within vessel 89 through the spaces between baffles 108 and 109. Therefore, tube section 114 has been designed to resolve any froth or foam which is carried into the upper portion of vessel 89. The operation of tubes 118 in resolving the foam or froth depends on the greater surface tension of the liquids as compared to gases. Foam entering one of tubes 118 will separate into its gaseous and liquid phases by means of the film of oil surrounding the gas bubble adhering to the tube surface and gas velocity tearing the bubble open. As the depth of this film grows, it will run to the bottom of tube 118 and form a drop of sufficient size to fall to the upper side of support plate 115 flowing to drain tube 119. It is then drained into the lower portion of vessel 89 through flapper 120. The gas then flows through mist eliminators 122, 123 and 124 as previously mentioned. Mist eliminators 122, 123 and 124 are designed to remove as much as possible of the extremely fine droplets of entrained mist and any gas bubbles which may have passed through tube section 114.

The oil flow within cyclones 95 and 96 is downwardly on walls 93 and 94 into weir box 105. As the level of oil in weir box 105 builds up, the oil will overflow. Perforated partitions 110, 111 and 112 are provided to retard the flow of foam through the lower portion of vessel 89. A large volume of space is available in this section of vessel 89 to accommodate the foam. Partitions 110, 111 and 112 are also spaced from the lower portion of vessel 89 to allow the oil from which most or all of the gas has been removed to flow through vessel 89 toward vertical partition 160. This oil flows over vertical partition 160 and down through wire mesh pad 162 into the zone of oil collecting thereunder between vertical partition 160 and vertical partition 161. Oil is discharged from vessel 89 through slots 164 and liquid discharge tube 163. Valve 169 controls the discharge of oil flowing out of vessel 89 through liquid discharge tube 163. Liquid level controller 166 is connected to valve 169 to control valve 169 in response to the position of float 168. With perforated baffles 110, 111 and 112 retaining the foam in vessel 89 away from discharge tube 163 and by causing the oil to be discharged from vessel 89 to flow through wire mesh pad 162 prior to discharge, the discharged oil is free of gas.

The term "stage separation" generally means, in the petroleum industry at least, the separation of the gaseous component from the liquid component of a high pressure wellstream in which a plurality of vessels or chambers are used and embodying a pressure reduction between each vessel or chamber. For the purposes of the present application, it is desired to use the term "stages of separation" to denote the different stages of treating the fluid stream, the gaseous component and the liquid component rather than the commonly accepted meaning. It has been found advantageous to withdraw as much of the gaseous component as could be withdrawn free of liquids subsequent to each stage of separation when the gaseous component could be withdrawn free of any entrained liquids or liquid mist. Also, it has been found desirable to withdraw the separated liquid component following each stage of separation when the liquid can be withdrawn at such points free of gas.

Thus, it can be seen that by withdrawing the completely separated gas and liquid subsequent to each stage of separation, the latter stages of separation in the vessel will have a very substantial decrease in fluid volume to process. This will increase the capacity of the vessel and will provide more efficient separation and a substantial savings by allowing a substantially smaller vessel to be used to process any given wellstream than could be used prior to the present invention.

What I claim and desire to secure by Letters Patent is:

1. The method of separating gas from liquid of a fluid stream comprising,
   flowing said fluid stream through a first gas-liquid separation stage in a vessel,
   separating at least a portion of the gas from the liquid in the fluid in said first separation stage,
   flowing said separated gas from said vessel subsequent to said first separation stage at a regulated rate sufficient to cause entrainment of a small amount of liquid in said separated gas,
   detecting the presence of liquid in said separated gas flowing from said vessel,
   reducing said flow of separated gas from said vessel subsequent to said first separation stage to a rate at which no liquid is entrained and just below the liquid entrainment velocity therein whereby the maximum flow of separated gas free of liquid is maintained,
   flowing the fluid stream from the first gas-liquid separation stage into a second gas-liquid separation stage which is subsequent to the removal of separated gas from the vessel,
   separating an additional portion of the gas from the liquid of the fluid stream in a second separation stage,
   flowing the additional portion of separated gas from said vessel subsequent to said second gas-liquid separation stage at a regulated rate sufficient to cause entrainment of a small amount of liquid in said additional portion of separated gas,
   detecting the presence of liquid in said additional portion of separated gas flowing from said vessel.
   reducing said flow of the additional portion of separated gas from said vessel subsequent to said second gas-liquid separation stage to a rate at which no liquid is entrained therein whereby the maximum flow of separated gas free of liquid is maintained, and
   flowing separated liquid free of gas subsequent to the first gas-liquid separation stage from said vessel.

2. The method according to claim 1 including the steps of
   flowing the fluid stream from said second gas-liquid separation stage through a third gas-liquid separation stage subsequent to the flowing of said additional portion of separated gas from said vessel, and
   flowing the remainder of the gas from said vessel subsequent to said third gas-liquid separation stage.

3. The method according to claim 1 including the step of
   flowing separated liquid from the vessel subsequent to said first gas-liquid separation stage, and
   preselecting the rate of flow of said separated liquid to a rate at which no gas will be entrained in such liquid.

4. An oil and gas separator comprising,
   a separation vessel,
   an inlet into said separation vessel,
   a first gas outlet from said separation vessel,
   a first separation means within said vessel and extending across said vessel at a position between said inlet into said vessel and said first gas outlet whereby all of the fluid entering said vessel flows through said first separation means,
   a flow control means on said first gas outlet to control the rate of flow of gas therethrough,
   bleed means connected into said first gas outlet for detecting entrained liquids flowing through said first gas outlet,
   a second gas outlet from said separation vessel,
   a second separation means extending across said vessel at a position between said first gas outlet and said second gas outlet whereby all of the fluid except the gas flowing out said first gas outlet flows through said second separation means,
   a flow control means on said second gas outlet to control the rate of flow of gas therethrough,
   bleed means connected into said second gas outlet for detecting entrained liquids flowing through said second gas outlet, and
   a liquid outlet from said vessel.

5. An oil and gas separator according to claim 4 including,
   a third separation means within said vessel and
   a third gas outlet,
   said third separation means positioned across said vessel between said second gas outlet and said third gas outlet.

6. An oil and gas separator according to claim 4 wherein
   said first and second separation means comprises knitted mesh pads positioned within said vessel to extend across the flow path of oil and gas flowing through said vessel.

7. An oil and gas separator according to claim 5 including
   a mist extractor positioned between said third separation means and said third gas outlet whereby the entrained liquid in gas flowing through said mist extractor to said third gas outlet will be removed.

References Cited by the Examiner

UNITED STATES PATENTS

| | | | |
|---|---|---|---|
| 801,679 | 10/05 | Niclausse | 201—522 |
| 2,228,401 | 1/41 | Pressler | 55—205 |
| 2,357,445 | 9/44 | Baker | 55—189 |
| 2,595,602 | 5/52 | Parks | 55—186 |
| 2,675,346 | 4/54 | Maclean | 202—69 |
| 2,681,150 | 6/54 | Reid | 55—169 |
| 2,701,056 | 2/55 | Morton | 55—345 X |
| 2,710,071 | 6/55 | Kinser et al. | 55—174 |
| 2,730,190 | 1/56 | Brown et al. | 55—45 |
| 2,762,451 | 9/56 | McNeil | 55—204 |
| 2,812,034 | 11/57 | McKelvey | 55—186 |
| 2,874,798 | 2/59 | Walker | 55—202 |
| 2,910,136 | 10/59 | Valiant et al. | |
| 2,925,878 | 2/60 | Spann | 55—185 |
| 3,009,537 | 11/61 | Glasgow et al. | 55—174 |
| 3,010,537 | 11/61 | Baker et al. | 55—337 |
| 3,064,410 | 11/62 | Wright | 55—185 |
| 3,085,690 | 4/63 | May | 210—499 |

FOREIGN PATENTS

| | | |
|---|---|---|
| 189,047 | 2/57 | Austria. |
| 863,908 | 3/61 | Great Britain. |
| 98,710 | 4/40 | Sweden. |
| 304,707 | 4/55 | Switzerland. |

REUBEN FRIEDMAN, *Primary Examiner.*